United States Patent [19]
Kato

[11] Patent Number: 5,016,340
[45] Date of Patent: May 21, 1991

[54] METHOD OF MANUFACTURE OF A ROTOR CORE MEMBER FOR A DYNAMOELECTRIC MACHINE

[75] Inventor: Masa Kato, Ibaragi, Japan

[73] Assignee: Kato Iron Works, Ltd., Hitachi, Japan

[21] Appl. No.: 568,218

[22] Filed: Aug. 16, 1990

[51] Int. Cl.$^5$ ............................................. H02K 15/02
[52] U.S. Cl. ......................................... 29/598; 72/377
[58] Field of Search ..................... 29/598; 72/352, 356, 72/358, 377, 344; 310/257, 263

[56] References Cited

U.S. PATENT DOCUMENTS

| | | | |
|---|---|---|---|
| 3,271,064 | 11/1962 | Priddy | 29/598 X |
| 4,041,754 | 8/1977 | Otani | 72/356 |
| 4,558,511 | 12/1985 | Kato | 29/598 |
| 4,759,117 | 7/1988 | Kato | 29/598 |

OTHER PUBLICATIONS

Melvin H. Verson, "The Ford Sandusky Project", Nov. 2, 3 and 4, 1965 pp. 8–10.

*Primary Examiner*—Carl E. Hall
*Attorney, Agent, or Firm*—Kinzer, Plyer, Dorn, McEachran & Jambor

[57] ABSTRACT

A method of manufacturing a magnetic rotor core member for a rotating-field dynamoelectric machine, particularly a small alternator, including the steps of hot forging a segment of steel bar stock into a core blank approximating the final volume desired for the rotor core member but with the pole piece finger angled outwardly from a central disc section at an angle of 45° to 80°, the fingers being shorter than required for the finished pole pieces, de-burring the core blank and gradually coling it. A shaft aperture is cold punched through the hub of the core blank, the pole piece fingers are bent into a vertical position relative to the rotor disc, and the pole piece fingers are ironed into close conformity with the required finished dimensions, in particular lengthening and shaping the fingers; this is al done in one step in a cold-forging press. The core blank is cold compressed to finished form as a rotor core member. Annealing is an optional step.

15 Claims, 2 Drawing Sheets

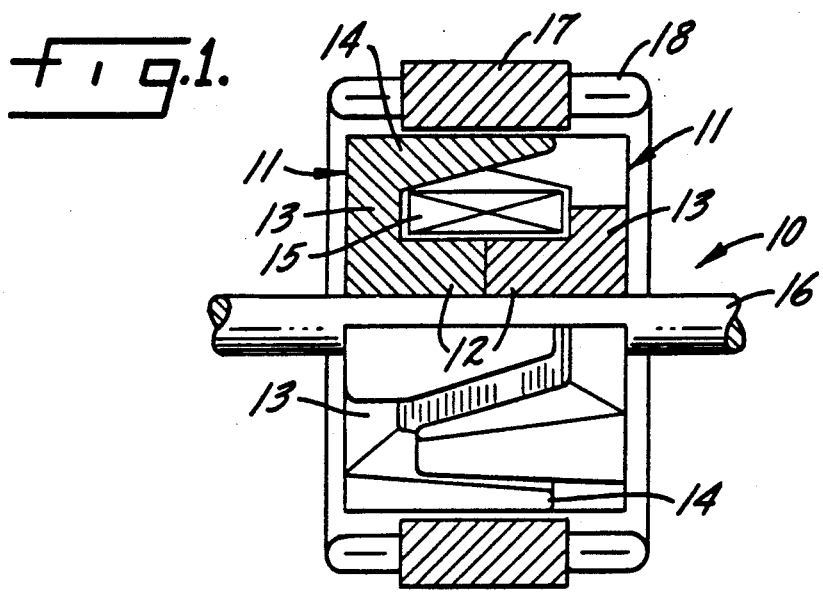

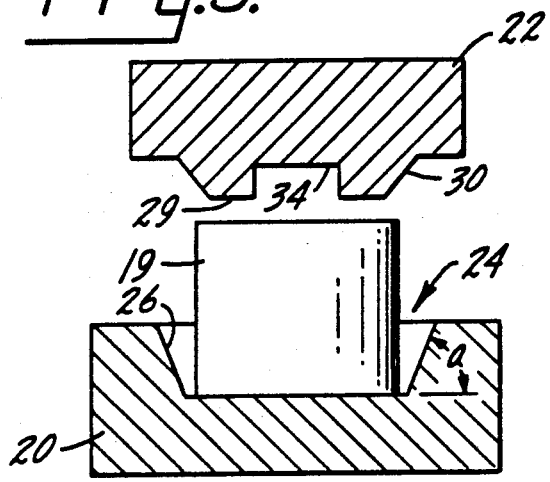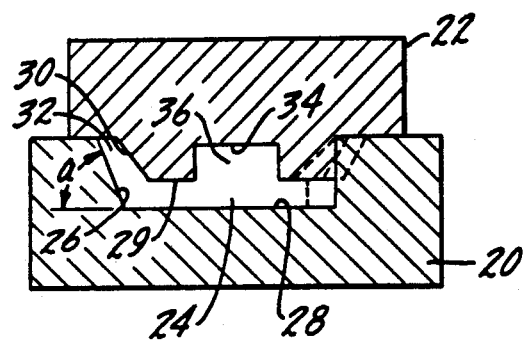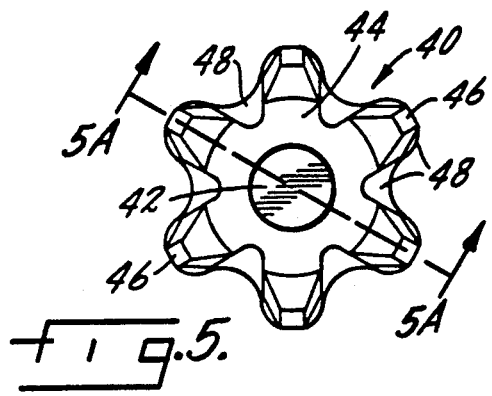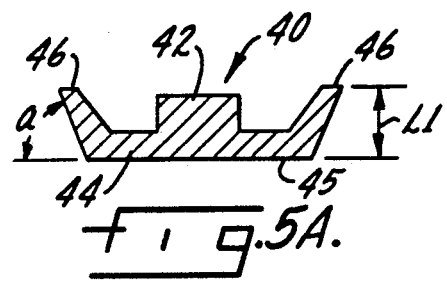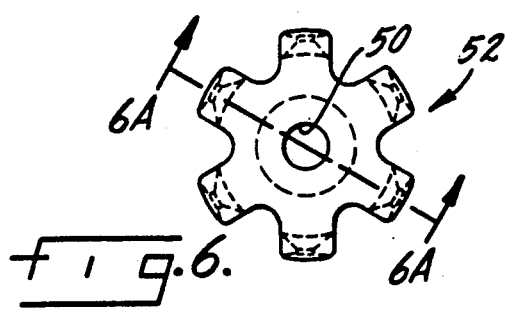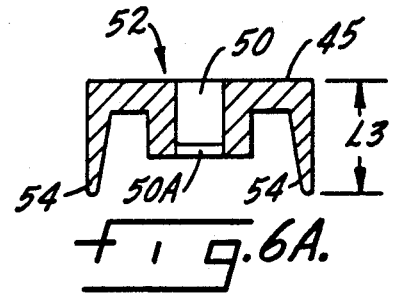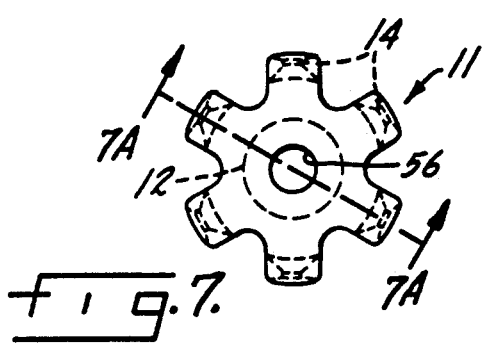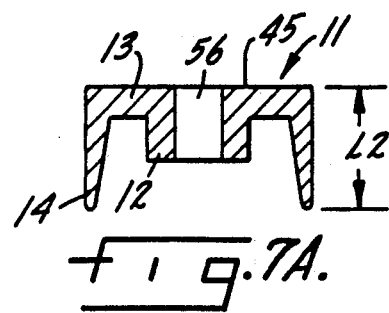

METHOD OF MANUFACTURE OF A ROTOR CORE MEMBER FOR A DYNAMOELECTRIC MACHINE

BACKGROUND OF THE INVENTION

Automotive vehicles and small vessels use D.C. electrical power sources for operation of lights and controls; the traditional power source for these applications once was a D.C. generator driven from the vehicle engine. More recently, with major improvements in rectifier technology, the D.C. generator has been replaced by the combination of a small alternator and a rectifier. The most practical and most widely used type of alternator employs a rotating magnetic field, using a field coil mounted in a core formed by two magnetic steel core members with interleaved finger-like pole pieces. For these magnetic core members, precision manufacture is essential.

Processes that have been employed in the manufacture of magnetic rotor core members for alternators and like dynamoelectric machines include cold forging (or cold extrusion) processes, cold forming stamping processes, hot forging processes, and combinations of hot forging, cold forging, and machining processes. These manufacturing procedures have each incorporated methods and techniques that have been developed independently and separately for each. Though significant improvements and advances in all of these methods have been achieved during past years, each of the known processes nevertheless still presents drawbacks and disadvantages which have proved difficult or impossible to overcome. Accordingly, each of these methods still leaves much to be desired in terms of yield rate, productivity, equipment required, etc.

For instance, the cold forging or cold extrusion method requires a large scale, high capacity press that affords an extremely high processing force. This presents substantial problems with respect to operating life and productivity of the tooling employed in the press. The cold forming stamping process presents a distinct disadvantage with respect to excessive consumption of the material from which a preliminary core blank is punched and an undesirable low yield rate. Further, this process cannot create an integral hub section, as used in many rotor core members, so that a separate rotor core spacer or hub has to be manufactured by some other process.

The hot forging process is inherently a higher yield rate procedure that has the further advantage of requiring less processing force than cold forging. However, hot forging alone is inadequate in attaining high dimensional accuracy and also is poorly adapted to producing a shaft aperture in the hub of the rotor core member. Consequently, the basic hot forging process must be followed by a number of machining steps to achieve the required finished form with precision controlled dimensional tolerances.

The best previously known methods of manufacturing magnetic rotor core members for dynamoelectric machines are described in the inventor's earlier U.S. Pat. No. 4,558,511 issued Dec. 17, 1985 and U.S. Pat. No. 4,759,117 issued July 26, 1988. Each employs a combination of hot forging and cold forging operations, and each has some operations like the present invention. Thus, each patented process, and the present invention, may employ the steps of cutting a segment from a steel bar, hot forging that segment to form a preliminary core blank with pole piece fingers, de-burring the preliminary core blank, gradually air cooling the blank, and cold compressing the blank. The prior patents also include a coining step.

According to the inventor's U.S. Pat. No. 4,558,511, the air-cooled blank may be directly cold-compressed; alternatively, rough machining may be needed. A problem with this process is that conventional hot-forged core blanks still include some excess volume even after being de-burred. These core blanks, more often than not, can be "die busters" when inserted directly into cold-compression dies. Thus, the alternative rough machining is most often necessary. At the same time, some parts of the core blank may be incomplete due to defects resulting from failure of the steel to flow into all parts of the die set during initial forging; this is a particular problem with the pole piece fingers. Rough machining is also used in the process of the inventor's later U.S. Pat. No. 4,759,117. In that process, the pole piece fingers start out shorter than required for the final rotor core, and are subsequently lengthened and ironed to final shape.

SUMMARY OF THE INVENTION

In almost any forging operation, movement of the metal proceeds sequentially; first, the metal moves horizontally, producing a burr at the parting line of the die, then flowing upwardly. The process of the present invention starts with forging of pole piece fingers that are shorter than ultimately required and that angle outwardly from the blank instead of projecting perpendicularly. This allows the steel to flow more smoothly in the initial forging and produces a number of substantial advantages as described below.

It is a primary object of the present invention to provide a new and improved method of manufacturing magnetic rotor core members for rotating-field dynamoelectric machines, particularly for alternators, that affords an appreciable and unusual improvement in metal yield rate and also eliminates any requirement for machining of the core members. The manufacturing method of the invention is carried out with forging operations as the principal steps and with the use of presses alone. The method of the invention produces finished rotor core members with a major reduction in waste of core material, with minimum energy consumption, and at minimal cost while maintaining the required dimensional precision.

In accordance with the present invention there is provided an improved method of manufacture of a magnetic rotor core member of predetermined volume for a dynamoelectric machine of the rotating-field type, the rotor core member including a cylindrical hub section mountable on a rotor shaft, an integral disc section extending radially outwardly from one end of the hub section, and a plurality of annularly spaced integral pole pieces projecting from the outer edge of the disc section in a direction parallel to the hub axis. The method comprises forging a segment of steel bar stock having a volume less than twenty percent greater than the required volume of the rotor core member to form a preliminary core blank, the preliminary core blank having a general approximation of the desired configuration for the rotor core member, the preliminary core blank including a central hub section, an integral disc section having a generally planar end surface extending radially outwardly from one end of the hub section, a plurality of pole piece fingers equally spaced around the outer edge of the disc section and projecting outwardly therefrom at an acute angle a to the end surface of the disc section, the angle a being in a range of 45° to 80°, the pole piece fingers having a shorter length than the finished predetermined lengths of the pole pieces of the desired final core member. The preliminary core blank is de-burred to form a secondary core blank essentially free of burrs. The central part of the secondary core blank is punched to form a shaft aperture therethrough, the pole piece fingers are bent to an angle of approximately 90° to the end surface of the disc section, and fourth step of ironing the pole piece fingers to shape those fingers into close conformity with the required configuration for the pole pieces of the rotor core member, all in a single step preferably performed in a cold-forging press. The secondary core blank is then compressed again to final form and dimensions, to complete the finished rotor core member; the final compression preferably, is again carried out in a cold forging press.

BRIEF DESCRIPTION OF THE DRAWINGS

FIG. 1 is a simplified, partially schematic half-sectional elevation view of a rotating-field alternator incorporating magnetic rotor core members manufactured by the method of the present invention;

FIG. 2 is a flow chart illustrating the steps for the method of the invention;

FIG. 3 is a simplified sectional elevation view of the mating portions of a set of forging dies at the beginning of a principal forging operation in the manufacturing method of the present invention;

FIG. 4 is a view like FIG. 3 but showing the end of the principal forging step;

FIGS. 5, 6 and 7 are elevation views of a rotor core member at successive stages in the method of manufacture of the present invention, FIG. 5 taken from the pole-piece side of the core member and FIGS. 6 and 7 taken from the disc side; and FIGS. 5A through 7A are simplified sectional views taken approximately as indicated in FIGS. 5-7.

DESCRIPTION OF THE PREFERRED EMBODIMENT

FIG. 1 illustrates a small alternator or other rotary dynamoelectric machine 10 of the rotating-field type; alternators having the construction generally illustrated for machine 10 are in common use in vehicles, small vessels, and other like applications. Alternator 10 includes a rotary magnetic core formed by two core members 11 which are usually essentially identical to each other. Each rotor core member 11 includes a cylindrical hub section 12, an integral disc section 13 extending radially outwardly from one end of the hub section, and a plurality of integral, finger-like pole pieces 14, angularly spaced from each other, that project from the outer edge of the disc section 13 in a direction parallel to the axis of hub section 12.

In alternator 10, the two rotor core members 11 are mounted on a shaft 16 that extends through their hub sections 12, the orientations of the two core members being such that their pole pieces 14 are interleaved with each other. A field coil 15 is mounted in encompassing relation to the hub sections 12 of the two core members 11 to complete the rotor for alternator 10. An annular stator core 17 is disposed in encompassing relation to the rotor of alternator 10 and supports the usual stator coils 18 from which the output of the alternator is derived. In FIG. 1, the stator 17,18 has been shown in simplified form because it is not relevant to the present invention.

FIG. 2 affords a flow chart of the steps involved in the method of manufacture of a rotor core member, such as one of the core members 11 of FIG. 1, according to the present invention. A number of intermediate stages of the process of FIG. 2 are illustrated in FIGS. 3-7 and FIGS. 5A-7A, culminating in a finished magnetic rotor core member 11 as shown in FIGS. 7 and 7A.

At the outset, in step 21 of the procedure illustrated in FIG. 2, a segment 19 of round steel bar stock (FIG. 3) that is to be shaped into a rotor core member is cut from a length of steel bar. A conventional cutting press can be utilized for step 21. The segment 19 of steel bar stock should have relatively closely controlled dimensions to avoid excessive waste and to assure adequate performance of succeeding steps in the manufacturing procedure. The bar stock employed may vary considerably; it usually constitutes a low carbon steel and must afford adequate magnetic properties for the core of an alternator or other small dynamoelectric machine. Care should be exercised so that the bar segment will have a volume only slightly larger than the volume of the finished rotor core; in any event, the bar segment volume should be less than twenty percent more than the volume of the finished rotor core.

In the next step 23 of the manufacturing method illustrated in FIG. 2, the bar stock segment 19 from step 21 is heated and hot forged in a set of forging dies 20 and 22, illustrated in FIG. 3. The forging dies comprise a lower die or drag 20 and an upper die or cope 22, which together define a die cavity 24. Dies 20 and 22 are used to form a preliminary core blank 40 that is illustrated in FIGS. 5 and 5A. The lower die 20 has an interior shape rather like an upwardly expanding hemispheric bowl, except that the rim of the bowl includes six indentations 32. Drag 20 is so designed that an acute angle a is formed between the outermost surface 26 of die cavity 24 and a planar radially and outwardly extending bottom surface 28 which forms the bottom surface 45 of the disc section 44 of the preliminary core blank 40 of FIGS. 4 and 5A. The angle a is generally in a range of from 45° to 80° and preferably is approximately 70°.

The cope 22 has a surface 30 which faces the die cavity 24 and is used to form the pole piece fingers 46, shown in FIGS. 5 and 5A. A central indentation 34 in the surface 30 provides a space 36 in the die cavity 24 which forms the hub section 42 of the preliminary core blank 40. The horizontally disposed drag surface 28 and cope surface 29 form the disc section 44 of core blank 40. Of the various surfaces 26,28,29,30 and 34 facing the space between the two dies, those facing downwardly, whether horizontally or at an angle, are engaged and shaped by the lower die 20, while those facing upwardly, again whether horizontally or at an angle, are engaged and shaped by the upper die 22.

The preliminary core blank 40, shown in FIGS. 5 and 5A, has a shape that is a general approximation of the desired external configuration for the finished rotor core member 11 (FIGS. 7 and 7A) with one major exception being the angle a of the pole piece fingers 46. The preliminary core blank 40 consists of a central hub section 42, still solid rather than cylindrical, an integral disc section 44 extending radially outwardly from one end of the hub section, and a plurality of integral fingers 46 that are equally spaced around the outer edge of the disc section 44 and project therefrom in a direction parallel to the axis of the hub section 42. The fingers 46, however, are formed with a length L1 that is somewhat shorter than the length L2 (FIG. 7A) required for the pole pieces 14 of a finished rotor core member 11, while all other elements are formed to as close an approximation as possible of their required final forms.

At this stage, a small amount of excess material in the original segment 19 of steel bar stock may produce forging burrs 48 around the periphery of the preliminary core blank 40, between and at the extremities of fingers 46. See FIG. 5. The excess material can be limited by the process to quite small amounts; the burrs 48 formed between and on the periphery of the pole piece fingers 46 are usually rather thin and finlike.

The next step 25 in the manufacturing procedure, FIG. 2, is deburring of the preliminary core blank formed in the preceding step 23. No sophisticated process is involved. Conventional punching procedures are utilized to eliminate the forging fringe or burr 48 from core blank 40 (FIG. 5). Deburring produces a cleaned-up version of the preliminary core blank 40.

In the next step 27 of the manufacturing procedure, FIG. 2, the preliminary core blank 40 from step 25 (see FIGS. 5 and 5A), which has been hot since step 23, is gradually air cooled. Most simply and effectively, the preliminary core blanks are left to cool from the red-hot condition in which they emerge from the deburring process (step 25) until they cool off naturally. The combination of the hot forging operation of step 23 and the gradual air cooling operation of step 27 affords, without the expense of special heat treatment procedures, an effect which is comparable to an annealing treatment that tends to homogenize the magnetic steel being worked, with the result that subsequent cold forging processes require less force and energy than if cold processing were used throughout the manufacturing procedure and with the further result that the final product affords improved electrical performance. An optional annealing step is also practicable, as is described hereinafter.

The next step 31 in the manufacturing procedure of FIG. 2 is cold punching of the central portion of hub section 42 to cut a shaft aperture 50, which results in the core blank 52 illustrated in FIGS. 6 and 6A. At the same time, the dies in the press employed for the cold punching operation bend and iron the fingers 54 so that they are at or about 90° to surface 45 and are shaped to a form, a length and dimensions very closely approximating those required for the pole pieces 14 of a finished rotor core member. Thus, at this stage, FIG. 6A, the length L3 of fingers 54 is appreciably greater than the initial finger length L1, FIG. 5A; L3 may still be very slightly shorter or longer than the required finished pole piece length L2 (FIG. 7A). The dimensions of the shaft aperture 50 are still inadequate and inaccurate, particularly in the portion of the aperture close to the open end 50A of the hub section, FIG. 6A.

A standard lubricating treatment, as part of the cold forging operation, is performed on the cooled core blank prior to the step 31 of cold punching, and also prior to the next step 33, again preferably a cold compression (FIG. 2). The lubrication treatment for the core blank may utilize a dry-type lubricant comprising a stearate-type Natrium soap, such as the lubricating soap available commercially under the trademark "BONDERLUBE". In accordance with conventional procedures, the core blanks also are preferably subject to pretreatment processes of deoxidizing, rinsing and coating with a film of zinc-phosphate, after which they are further covered with a film of the dry-type lubricant. The lubrication treatment alleviates friction between compression dies (not shown) and the core blank, helps avoid scorching of the core blank, and reduces the forging loads.

A section or a part of a hot forged workpiece which is long yet slender in contour, like a pole piece of a rotor core member, is the trickiest of all sections, and can at times emerge from the hot forging dies with an inadequate or incomplete shape, particularly in length, rendering the hot forged blank a reject. To minimize the risks of such defective forgings, manufacturers utilizing traditional hot forging processes start with a metal segment having a substantially greater volume than theoretically required in order to insure that these difficult sections acquire a desired, complete shape with an adequate volume of metal. This is one of the reasons the pole piece fingers 46 are formed in a lesser length L1 in the initial hot forging stage 23 and then bend and ironed to a very close approximation L3 of their required final shape and length L2 in the subsequent cold forging and ironing procedure of step 31.

The next step 33 in the manufacturing process, FIG. 2, is a compression procedure, preferably carried out in a conventional cold forging press, to achieve the final, finished shape for a rotor core member 11 illustrated in FIGS. 7 and 7A. As with the preceding step 31, a single cold compression is usually adequate. This concluding cold forming procedure provides the final, finished configuration for all elements of rotor core member 11, including the hub section 12 with its finished shaft aperture 56, the disc section 13 that joins the pole pieces 14 to hub 12, and all edges, transition surfaces and corners.

The process of the present invention provides a number of advantages. The process makes it unnecessary to use a large excess of steel in the initial steel bar segment 19 (FIG. 3) in order to obtain the desired metal flow in previously known techniques. Because the peripheral portions of the cope 22 and drag 20 that form the initially angled pole piece fingers 46 (FIG. 5A) afford a dramatic improvement in metal flow during the initial forging operation, a substantially smaller volume of starting metal (steel) can be used. This materially reduces the metal requirement; the volume for segment 19 is kept to less than twenty percent in excess of the final volume for a finished rotor core member, an amount that would be impractical and would regularly produce defective, incomplete pole piece fingers in a conventional process.

With the use of a materially reduced volume for the original steel segment, the preliminary core blank 40, after deburring (FIGS. 5, 5A) much more closely approximates that of a finished rotor member 11 (FIGS. 7, 7A) than in previously known processes. This effectively eliminates any need for rough machining, and also eliminates the coining step that has been necessary, using prior techniques, as a preliminary procedure to get surfaces of the blanks in condition suitable for machining. Further, the elimination of machining, whether rough or precision machining, allows a "presses only" system of manufacture in which the production line is not interrupted by procedures and equipment of different types. That is, the production system can be automated and streamlined much more easily because all principal procedures are performed in presses and no machining steps are employed.

The uniformity in quantity of metal in the core blanks 40 that is made possible by use of the angled pole piece cavities 32 affords such other benefits as ease of subsequent cold forging, requiring less force and energy, a prolonged life for the cold forging dies used in steps 31 and 33, reduction of spoilage of cold forged blanks, and reduction of dimensional variations, with resulting higher yield rates and greater dimensional precision. It should be stressed that major advantages of the process of the invention include a major saving in starting material (steel) and the substantial improvement in ease of automation of the overall manufacturing system.

In the foregoing description, the descriptions of procedures as being carried out by hot forging are presented to afford the requisite description of the inventor's preferred mode of carrying out the invention. It should be understood, however, that the forging steps of the invention, particularly in the initial stages, are subject to modification to suit the needs and desires of the manufacturer. Thus, warm-forging and cold-forging procedures could be used in forming the preliminary blanks 40, if desired. Needless to say, however, conditions such as die strength, press force, etc., have to be carefully considered when determining the type of forging employed.

I claim:

1. An improved method of manufacture of a magnetic rotor core member of predetermined volume for a dynamoelectric machine of the rotating-field type, the rotor core member including a cylindrical hub section mountable on a rotor shaft, an integral disc section extending radially outwardly from one end of the hub section, and a plurality of annularly spaced integral pole pieces projecting from the outer edge of the disc section in a direction parallel to the hub axis, the method comprising the following steps:
   A. forging a segment of steel bar stock, having a volume less than twenty percent greater than the required volume of the rotor core member to form a preliminary core blank, the preliminary core blank having a general approximation of the desired configuration for the rotor core member, the preliminary core blank including a central hub section, an integral disc section having a generally planar end surface extending radially outwardly from one end of the hub section, a plurality of pole piece fingers equally spaced around the outer edge of the disc section and projecting outwardly therefrom at an acute angle a to the end surface of the disc section, the angle a being in a range of 45° to 80°, the pole piece fingers having a shorter length than the finished predetermined lengths of the pole pieces of the desired final core member;
   B. de-burring the preliminary core blank to form a secondary core blank essentially free of burrs;
   C. cold punching the central part of the secondary core blank to form a shaft aperture therethrough, bending the pole piece fingers to approximately 90° to the end surface of the disc section, and ironing the pole piece fingers to shape those fingers into close conformity with the required configuration for the pole pieces of the rotor core member; and then
   D. compressing the secondary core blank to final form and dimensions to complete a finished rotor core member.

2. The method of manufacturing a magnetic rotor core member according to claim 1 including the following additional step:
   B1. gradual air-cooling of the secondary core blank prior to step C.

3. The method of manufacturing a magnetic rotor core member according to claim 2 in which compression of the secondary core blank in step D is carried out in at least two sequential cold compression operations.

4. The method of manufacturing a magnetic rotor core member according to claim 1 in which step C is carried out as a single, simultaneous operation in a cold-forging press.

5. The method of manufacturing a magnetic rotor core member according to claim 4 including the following additional step:
   B1. gradual air-cooling of the secondary core blank prior to step C.

6. The method of manufacturing a magnetic rotor core member according to claim 4 including the following additional step:
   B1. gradual air-cooling of the secondary core blank prior to step C.

7. The method of manufacturing a magnetic rotor core member according to claim 1 in which steps A, C and D are carried out by means of dies which form rounded corners at the outer rims of the pole pieces and at the edges of the disc section.

8. The method of manufacturing a magnetic rotor core member according to claim 1 wherein in step A, the angle a is approximately 70°.

9. The method of manufacturing a magnetic rotor core member according to claim 4 wherein in step A, the angle a is approximately 70°.

10. An improved method of manufacture of a magnetic rotor core member of predetermined volume for a dynamoelectric machine of the rotating-field type, the rotor core member including a cylindrical hub section mountable on a rotor shaft, an integral disc section extending radially outwardly from one end of the hub section, and a plurality of annularly spaced integral pole pieces projecting from the outer edge of the disc section in a direction parallel to the hub axis, the method comprising the following steps:
   A. forging a segment of steel bar stock to form a preliminary core blank having a general approximation of the desired external configuration for the rotor core member, the preliminary core blank including a central hub section, an integral disc section having a generally planar end surface extending radially outwardly from one end of the hub section, and a plurality of pole piece fingers equally spaced around the outer edge of the disc section and projecting outwardly therefrom at an acute angle a to the end surface of the disc section, the angle a being in a range of 45° to 80°, the lengths of the pole piece fingers being less than the finished lengths of the pole pieces;
   B. de-burring the preliminary core blank to form a secondary core blank essentially free of burrs;
   C. cooling the secondary core blank;
   D. punching the central hub section to form a shaft mounting aperture in the central part of the secondary core blank, bending the pole piece fingers to approximately 90° relative to the end surface of the disc section, and ironing the pole piece fingers to shape those fingers into close conformity with the predetermined configuration for the pole pieces of the rotor core member; and then E. cold compressing the secondary core blank, in a cold forging press, to final form and dimensions to complete a finished rotor core member.

11. The method of manufacturing a magnetic rotor core member according to claim 10 in which step C is carried out by gradual air-cooling of the secondary core blank.

12. The method of manufacturing a magnetic rotor core member according to claim 11 in which cold compression of the secondary core blank in step E is carried out in at least two sequential cold compression operations.

13. The method of manufacturing a magnetic rotor core member according to claim 12 in which steps A, D and E are carried out by means of dies which form rounded corners at the outer rims of the pole pieces and at the edges of the disc section.

14. The method of manufacturing a magnetic core member according to claim 13 in which the angle a in step A is approximately 70°.

15. The method of manufacturing a magnetic core member according to claim 10 in which the angle a in step A is approximately 70°.

* * * * *